Dec. 21, 1926.
E. LARSSON
1,611,596
CHAIN COUPLING FOR LOGS
Filed April 26, 1926
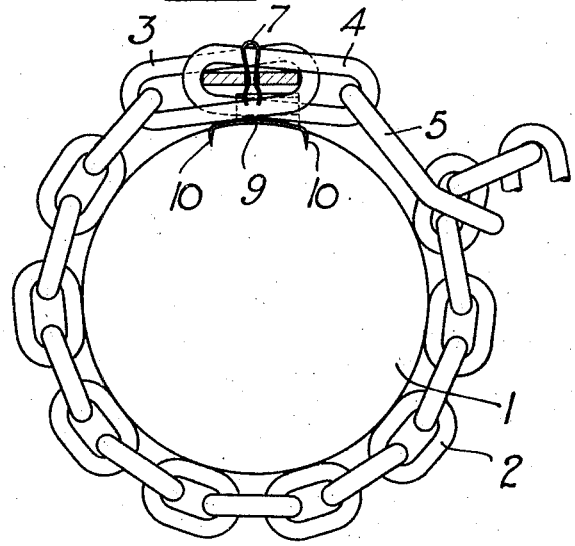
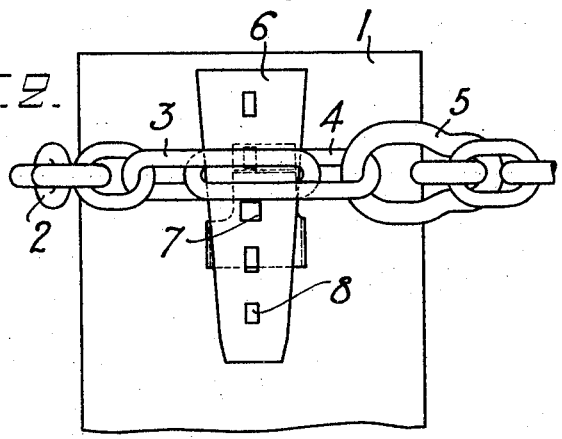
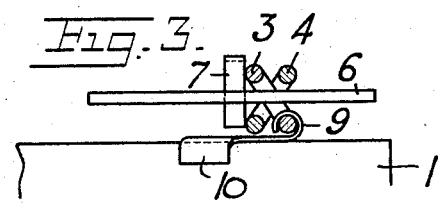
Inventor
Edward Larsson,
By [signature] Atty Patented Dec. 21, 1926.

1,611,596

UNITED STATES PATENT OFFICE.

EDWARD LARSSON, OF STOCKHOLM, SWEDEN.

CHAIN COUPLING FOR LOGS.

Application filed April 26, 1926, Serial No. 104,740, and in Sweden April 30, 1925.

In floating logs in rivers or other water courses it is well known to place at such places where the logs have a tendency to strike the shores one or more rows of floating logs connected to each other by means of chains. The chains are laid around the logs as loops which are tightened by various means such as wedges, screws and the like. Chain couplings of this kind heretofore known suffer from the disadvantage that they are rather complicated and of such construction that they are often released or destroyed by floating logs passing by.

The object of the invention is to provide a coupling of the said kind which is very simple and at the same time quite reliable.

The invention consists chiefly in this that in the portion of the chain adapted to form the loop around a log two links engaging each other are of greater length than the other links of the chain and so dimensioned that the same when pushed towards each other in longitudinal direction form between their ends otherwise bearing against each other an opening of sufficient width to receive a wedge by which the loop can be tightened around the log.

In the accompanying drawing I have shown one embodiment of my invention. Fig. 1 shows diagrammatically an end view of a log and a chain loop around the same. Fig. 2 is a plan view of Fig. 1 and Fig. 3 shows a side view of the wedge, the links through which the wedge is inserted being shown in section.

In the portion of the chain 2 forming a loop around the log 1 two links 3 and 4 engaging each other are of greater length than the other links. The link 4 is engaged by a usual locking link 5 which constitute the one end of the chain and through which the other end of the chain is passed when the chain has been placed around the log. After the chain has been locked in the link 5 it should lie so loosely around the log that the two links 3, 4 can be pushed together to such an extent that they form between their ends an opening of sufficient width to receive a wedge 6 which is then forced into the said opening until the chain loop has been tightened sufficiently around the log. For securing the wedge in position I provide in the same a plurality of holes 8 and into one of the same I force a strong U-shaped spring 7 having its ends bent outwards, as is shown in Fig. 1, so that the spring locks itself in the hole in which it has been inserted. Instead of the said spring obviously a bolt or the like may be used.

In order to prevent the chain loop from sliding on the log in the longitudinal direction thereof a plate 9 is pivotally connected to the one of the said elongated chain links, said plate being formed with sharp portions such as edges 10 or the like adapted to be forced into the log as is indicated in Fig. 1.

Having now described my invention what I claim is:

1. A chain coupling for floating logs comprising a chain adapted to form a loop around a log and having a locking link for locking the said loop, a wedge for tightening the loop around the log, two adjacent links of the portion of the chain adapted to form the loop being of greater length than the other links of the chain and so dimensioned that the same when pushed together longitudinally form between their ends otherwise bearing against each other an opening of sufficient width to receive the said wedge, and means connected to one of said two links for connecting the latter to the log.

2. A chain coupling for floating logs comprising a chain adapted to form a loop around a log and having a locking link for locking the said loop, and a wedge for tightening the loop around the log, two links of the portion of the chain adapted to form the loop being of greater length than the other links of the chain and so dimensioned that the same when pushed together longitudinally form between their ends otherwise bearing against each other an opening of sufficient width to receive the said wedge, a plate being pivotally connected to the one of said two links of greater length and formed with sharp portions adapted to be forced into the log, substantially as and for the purpose set forth.

In testimony whereof I have hereunto subscribed my name.

EDWARD LARSSON.